United States Patent [19]

Breitbarth et al.

[11] Patent Number: 4,799,753
[45] Date of Patent: Jan. 24, 1989

[54] TERMINAL FOR A RADIATION CONDUCTOR

[75] Inventors: Friedrich-Wilhelm Breitbarth; Hans-Jürgen Tiller; Michael Grosch, all of Jena, German Democratic Rep.; Albert Schmidt, Bad Homburg, Fed. Rep. of Germany; Ralf Janda, Bad Homburg, Fed. Rep. of Germany; Steffen Oppawsky, Bad Homburg, Fed. Rep. of Germany

[73] Assignee: Kulzer & Co. GmbH, Wehrheim, Fed. Rep. of Germany

[21] Appl. No.: 854,349

[22] Filed: Apr. 21, 1986

[30] Foreign Application Priority Data

Apr. 25, 1985 [DD] German Democratic Rep. ... 275544

[51] Int. Cl.$^4$ ................................................. G02B 6/32
[52] U.S. Cl. ............................... 350/96.18; 350/96.10; 362/32; 433/229
[58] Field of Search ............ 362/32; 350/96.18, 96.10, 350/96.26; 433/25, 229

[56] References Cited

U.S. PATENT DOCUMENTS

| | | | |
|---|---|---|---|
| 4,266,534 | 5/1981 | Ogawa | 362/32 X |
| 4,385,344 | 5/1983 | Gonser | 362/32 |
| 4,445,858 | 5/1984 | Johnson | 433/229 X |
| 4,449,928 | 5/1984 | von Weissenfluh | 433/229 X |
| 4,666,405 | 5/1987 | Ericson | 433/229 |
| 4,666,406 | 5/1987 | Kanca, III | 350/96.1 X |

Primary Examiner—John D. Lee
Attorney, Agent, or Firm—Felfe & Lynch

[57] ABSTRACT

A terminal for a light conductor for uniform illumination of a rectangular field in medical and, especially, dental applications has a transparent, cylindrical lens body in a mount with its axis perpendicular to the axis of a socket for receiving the light exit end of the light conductor. The side of the cylindrical lens body facing the socket has a trough-shaped recess of symmetric cross section. The width of the trough-shaped recess continuously expands from the bottom to the margin of the trough-shaped recess, the bottom being perpendicular to the axis of the socket and perpendicular to the axis of the cylindrical lens body.

18 Claims, 2 Drawing Sheets

TERMINAL FOR A RADIATION CONDUCTOR

BACKGROUND OF THE INVENTION

The invention relates to a terminal for a radiation conductor for medical and, especially, dental applications, for example, and a lens for use at the end of a light conductor from which the light emerges, more particularly.

A terminal for a laser light conductor is disclosed in West German patent publication No. 21 45 921. It is intended to increase the divergence of the laser beam from the light conductor only relatively slightly and transmit high radiation powers with only low losses in the terminal while remaining convenient to manipulate. For this, specifically, the terminal tapers from its ends to its middle. The terminal is to be used with a focusing lens on the end of the light conductor from which the laser beam emerges for cutting and coagulating tissues and the like in medical applications, in addition to other purposes.

However, the terminal has the same, round cross section as the laser light conductor with which it is used and, therefore, emits the light in a beam also having a round cross section. As a result, the light beam impinges on a surface as a radiation field for use either normally in a round spot, which is too small and/or non-corresponding to the use intended, or obliquely in an oval spot, which necessarily introduces intensity variation along the major axis and is prone to shadows on uneven surfaces for further intensity variation. Both are undesirable for many uses. For example, in dentistry, it may be desirable to cure a material along a row of teeth with ultraviolet radiation. This requires an elongated, generally rectangular radiation field thereon with, preferably, uniform intensity thereover for uniform curing.

Masks have also been used to make a radiation field rectangular. This is necessarily inefficient, however, because of the radiation lost on the mask.

SUMMARY OF THE INVENTION

Accordingly, it is an object of the invention to provide a thermal for a radiation conductor for medical and, especially, dental applications, for example, which provides very uniform irradiation (including illumination from light radiation) over a substantially rectangular field of irradiation.

To this and other ends, the invention provides a terminal for an end of a radiation conductor which emits radiation along the axis of the end of the radiation conductor. The terminal has a transparent, cylindric lens body which may be axially truncated to have a flat side is oriented by a mount with its axis perpendicular to and intersecting the axis of the light-exit end of the light conductor. The axial center of the side of the lens body facing the light conductor which is the flat side when the lens body is axially truncated has a trough-like, generally-cylindric recess of symmetric cross section across its axis opening toward the light-exit end of the light conductor. The width of the recess continuously expands from its bottom to its margins and its axis and, thus, bottom is perpendicular to the axes of the light exit end conductor and the cylindric lens body. Such a terminal produces a uniformly illuminated, rectangular field of illumination irradiation.

The size of the field of irradiation depends on the size of the cylindric lens body. For example, with a cylindric lens body having a diameter of 15 mm and a length of 20 mm, a field measuring 15 mm×20 mm can be irradiated.

The width of the field of irradiation from the cylindric lens body remains virtually constant when the distance from the lens to the plane of the field of irradiation is varied, while the length of the field of irradiation increases with increasing distance. This often corresponds to requirements for use, for example, when the terminal is used in dentistry to set a plastic composition along a row of teeth in the patient's mouth. Here, the width of the field of irradiation is determined by the width of the row of teeth which remains relatively constant therealong, while the length of the field of irradiation is determined by the number of teeth in the row having the composition to be irradiated thereon which varies with the procedure.

The intensity of the irradiation field depends substantially on that of the light from the light conductor. Radiation losses due, for example, to the mask heretofore commonly used in order to make a rectangular illumination field are virtually nonexistent. This is desirable for efficiency.

It is important that the axes of the light-exit end of the light conductor, the cylindric lens body, and the trough-like recess in the cylindric lens body be as orthogonal as possible. Any departure from this relationship results in decollimation of the light, the consequence of which is a lack of homogeneity of the irradiation field.

Preferably, the recess is centered in the cylindric lens body and has an arcuate cross section. This uniformly distributes the light emerging from the light-exit end of the light conductor which is disposed in line with the center of the recess to both halves of the cylindric lens body on the opposite sides of the recess. The depth of the recess from the top surface of the cylindric lens body is to be selected according to the diameter and length of the cylindric lens body.

If necessary, the preferred, arcuate cross section of the recess can be approximated by the segmented cross section of individual flat surfaces running longitudinally of the recess. The recess should then have, however, at least three individual flat surfaces.

Either formation of the recess can have an anti-reflective surface coating to reduce or prevent light losses at the surface of the recess as the light enters the transparent, cylindric lens body.

The homogeneity of the light irradiation of the field can be improved advantageously by flattening the cylindric lens body on its side facing the light exit end of the light conductor and having the recess. In the case of a light conductor having a flat exit end, the flattened side of the cylindric lens body preferably is parallel to the light exit end of the light conductor.

Dulling, roughening or mirroring the preferably flattened side of the cylindric lens body facing the light exit end of the light conductor and having the recess from the edges of the recess outwardly preferably prevents additional light losses by reflecting light entering the cylindric lens body through the recess into the interior of the cylindric lens body. This also provides additional homogeneity to the radiation filed. In like manner, it is advantageous also to dull, roughen or mirror the end faces of the cylindric lens body for reflection into the interior of the cylindric lens body.

It has proven especially advantageous to space the light exist end of the light conductor from the recess such that the distance A between the light exist end of the light conductor and the bottom of the recess satisfies the condition: h≦A≦r, wherein h is the depth of the recess in the cylindric lens body and r is the radius of the cross section of the recess; this condition is applicable to a system in which the diameter of the light conductor corresponds approximately to the width of the recess.

Preferably, the light exit end of the light conductor is spaced from the plane of the axial margins of the recess such that the recess is just completely illuminated by the light emerging therefrom. It is to be noted in this connection that the light emerging from the light conductor generally diverges from the axis of the end of the light conductor at a solid angle of or about 25°. If the distance of the end of the light conductor from the recess is too great, the illumination of the center of the recess is substantially stronger than that of its margins. This reduces field homogeneity.

In order to facilitate cleaning the cylindric lens and replacing it easily with another lens body, the cylindric lens body is preferably disposed removably in the mount. Likewise, it is preferably possible to plug the light exit end of the light conductor removably into the mount in order to be able, if desired, to replace the complete terminal quickly.

BRIEF DESCRIPTION OF THE DRAWINGS

Additional details and advantages of the invention will be described in conjunction with drawings of preferred embodiments which illustrate but do not limit the invention, wherein:

FIG. 1 is a perspective view of one preferred embodiment of a terminal with a light conductor for supplying light thereto and a workpiece for receiving a field of light therefrom, as in operation;

Figure 2:
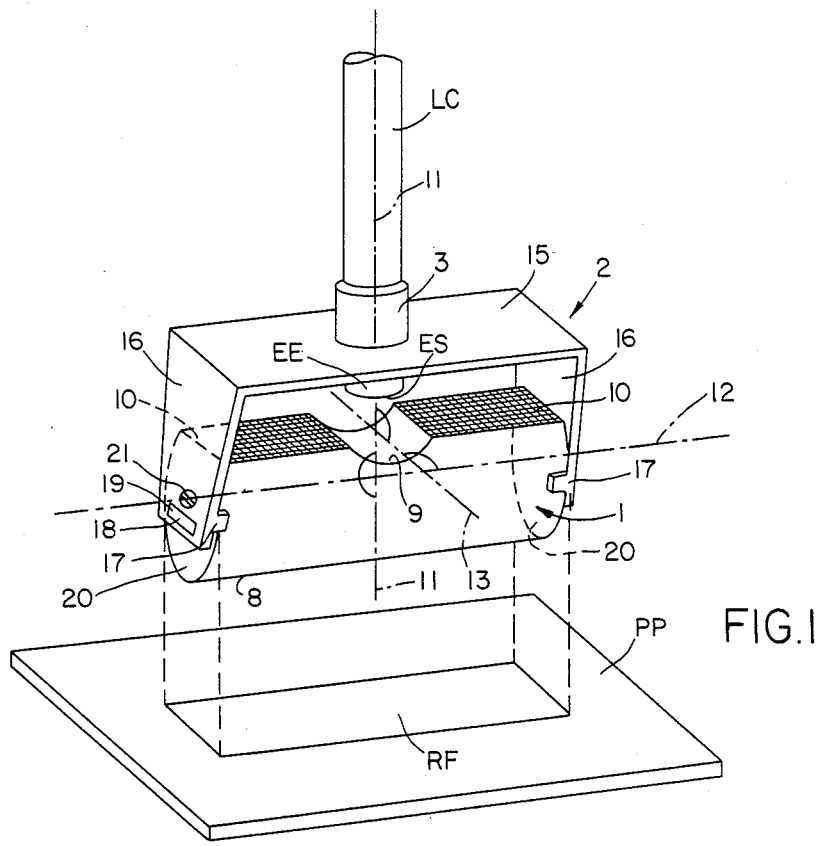
FIG. 2 is an end view of a cylindric lens body portion of the embodiment shown in FIG. 1.

DESCRIPTION OF THE PREFERRED EMBODIMENTS the terminal shown in FIG. 1 has a transparent, cylindric lens body at 1 in a mount at 2. For use, the mount releasably snaps about the light-exit end EE of a light conductor LC, as shown, with a socket 3. The terminal then produces a rectangular field of light RF on a planar plate PP. As shown, the mount at 2 is oriented such that the bottom edge 8 and axis 12 of the cylindric lens body at 1 are parallel to the planar plate PP.

The center of the side of the cylindric lens body at 1 facing the light conductor-receiving socket 3 of the mount at 2, the top side, as shown, has a trough-like, cylindric recess 9. This, top side of the cylindric lens body at 1 also has flat surfaces 10 truncating the cylindric lens body on both sides of the recess 9 which are parallel to the axis of the cylindric lens body. The opposite side of the cylindric lens body then forms a cylindric lens. In order to obtain a homogeneous, uniformly-illuminated, light-irradiation field RF, the axis 11 of the socket 3 and, thus, the light exit end EE of the light conductor LC, the axis 12 of the cylindric lens body at 1 and the axis 13 of cylindric symmetry of the recess 9 are perpendicular to one another, as indicated in FIG. 1.

The flat surfaces 10 on the upper side of the cylindric lens body at 1 are also parallel to the light exit surface ES of the light conductor LC which, in this case, is planar. The flat surfaces 10 are also roughened in a fine, grid pattern to be internally reflecting.

The mount at 2 is preferably made of plastic. It has a base 15 corresponding to the length of the cylindric lens body at 1 and having the socket 3 for the light conductor LC centrally. Holders 16 extend at right angles from each end of the base for holding the cylindric lens body at 1. For this, the cylindric lens body at 1 is gripped centeringly between tabs 17 which project from the holders 16 to engage the sides of the cylindric lens body and has centering pins 18 (only one shown) which extend from the end faces 20 of the cylindric lens body into corresponding recesses 19 in the holders 16. In addition, the cylindric lens body is fastened in the mount 2 by screws 21 (only one shown) through the holders 16.

Figure 3:
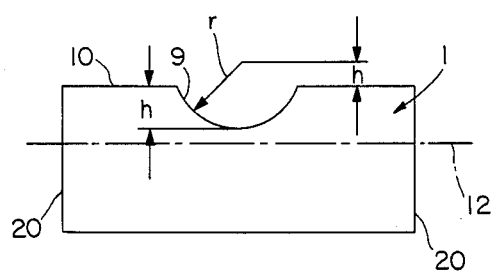
FIG. 3 is a front view of the cylindric lens body portion of the embodiment of FIG. 1 shown in FIG. 2.

As better seen in FIGS. 2 and 3, the recess 9 of the cylindric lens body at 1 is cylindric with a radius R that is uniform over its entire length. The length of recess 9 should be at least as great as the diameter of the light conductor LC and extend across the entire width of the cylindric lens body, as shown. The recess 9 is precisely in the center of the axial length of the cylindric lens body. The center point of the radius r of the recess 9 lies approximately on an arc of the radius R of the cylindric lens body, as shown by the dimension h' on the upper side of the Figures. The cylindric lens body is flattened to the surfaces 10 to the depth h' which, in the present case, is approximately 1/6th of the diameter of the cylindric lens body. The depth h of the trough-like recess reaches approximately to the axis 12 of the cylindric lens body.

Figure 4:
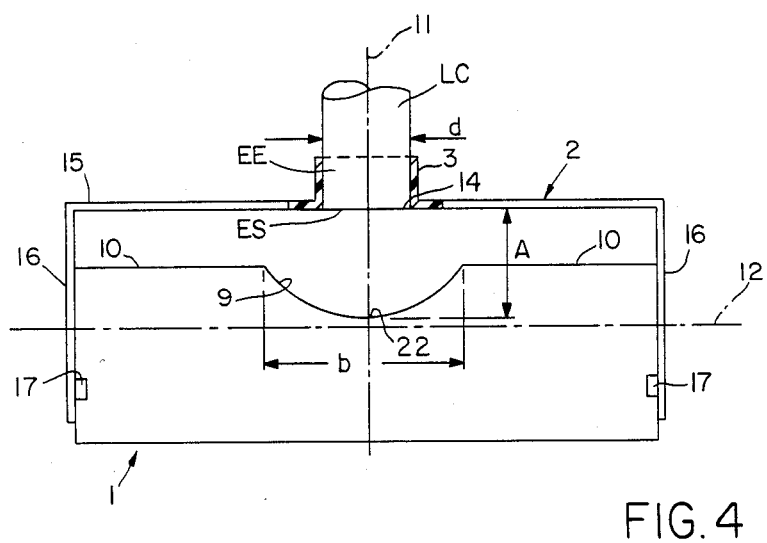
FIG. 4 is a front view of a portion of the embodiment shown in FIG. 1, partly broken away and in section.

FIG. 4 shows the relative position of a light-exit surface ES of the light-exit end EE of the light conductor with respect to the bottom 22 of the trough-shaped recess 9. The distance A between the light exit surface ES and the bottom 22 of the recess 9 is to satisfy the condition h≧A≧r, wherein h (FIG. 3) is the depth and r (FIG. 3) is the radius of the trough-shaped recess. This condition applies to a system in which the diameter d of the light conductor LC and, thus, its exit surface ES is approximately the same as the width b of the recess, or slightly smaller, as shown.

Figure 5:
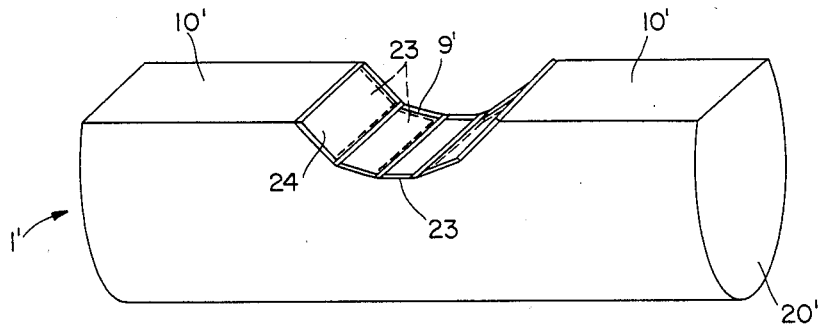
FIG. 5 is a perspective view of a cylindric lens body portion of another preferred embodiment.

FIG. 5 shows a transparent, cylindric lens body at 1', truncated with flat surfaces 10' on either side of a generally-cylindric recess 9' like that of FIGS. 1 to 4. It differs from that of FIGS. 1 to 4, however, in that the recess 9' is formed of five, successive, individual flat surfaces 23 each extending parallel to the axis of the recess lengthwise, all across the cylindric lens body to form a segmented cross section on the axis of the cylindric lens body which approximates arcuate. Such approximation of either cylindric lens is appropriate. The surfaces 23 also have an anti-reflect coating 24 thereon to better accept radiation and the end faces 20' (only one shown) are mirrored for reflection toward the interior of the cylindric lens body at 1'.

It will be understood that the specification and examples are illustrative but not limitative of the present invention and that other embodiments within the spirit and scope of the invention will suggest themselves to those skilled in the art.

What is claimed is:

1. Radiation conductor terminal providing uniform irradiation over a substantially rectangular field comprising:
   a radiation conductor having end means emitting radiation along the axis of the conductor;
   transparent, longitudinal cylindrical lens body means with rectangular cross sections in planes perpendicular to the axis of the radiation conductor one side of which faces the end of said radiation conductor;
   means for mounting said lens body means and the end of said radiation conductor with the axis of said lens body perpendicular to the axis of the radiation conductor; and
   said lens body having a transverse trough-shaped recess axially symmetrical in cross section and opening with a continuously expanding width toward the end of said radiation conductor, the bottom thereof being perpendicular to the axis of the radiation conductor and perpendicular to the axis of said lens body, said trough being transverse to the rectangular cross sections of said lens body, whereby radiation emitted from the end of said radiation conductor is uniformly illuminated in a rectangular field of illumination radiation.

2. The terminal of claim 1 wherein the trough-shaped recess has an arcuate cross section.

3. The terminal of claim 1 wherein the arcuate cross section of the trough-shaped recess is approximated by individual flat surfaces extending lengthwise of the trough-shaped recess.

4. The terminal of claim 3 wherein each surface of the trough-shaped recess has an antireflection coating thereon.

5. The terminal of claim 3 wherein the cylindrical lens body has truncating flattened surfaces on its side facing the end of the radiation conductor on both sides of the trough-shaped recess.

6. The terminal of claim 3 wherein the side of the cylindrical lens body facing the end of the radiation conductor is one of dulled, roughened, and mirrored for reflection toward the interior of the cylindrical lens body on both sides of the recess.

7. The terminal of claim 3 wherein the cylindrical lens body has end faces which are one of dulled, roughened, and mirrored for reflection toward the interior of the cylindrical lens body.

8. The terminal of claim 1 wherein each surface of the trough-shaped recess has an anti-reflection coating thereon.

9. The terminal of claim 8 wherein the cylindrical lens body has truncating flattened surfaces on its side facing the end of the radiation conductor on both sides of the trough-shaped recess.

10. The terminal of claim 8 wherein the side of the cylindrical lens body facing the end of the radiation conductor is one of dulled, roughened, and mirrored for reflection toward the interior of the cylindrical lens body on both sides of the recess.

11. The terminal of claim 4 wherein the cylindrical lens body has end faces which are one of dulled, roughened, and mirrored for reflection toward the interior of the cylindrical lens body.

12. The terminal of claim 1 wherein the cylindrical lens body has truncating flattened surfaces on its side facing the end of the radiation conductor on both sides of the trough-shaped recess.

13. The terminal of claim 12 wherein the side of the cylindrical lens body facing the end of the radiation conductor is one of dulled, roughened, and mirrored for reflection toward the interior of the cylindrical lens body on both sides of the recess.

14. The terminal of claim 12 wherein the cylindrical lens body has end faces which are one of dulled, roughened, and mirrored for reflection toward the interior of the cylindrical lens body.

15. The terminal of claim 1 wherein the side of the cylindrical lens body facing the end of the radiation conductor is one of dulled, roughened, and mirrored for reflection toward the interior of the cylindrical lens body on both sides of the recess.

16. The terminal of claim 15 wherein the cylindrical lens body has end faces which are one of dulled, roughened, and mirrored for reflection toward the interior of the cylindrical lens body.

17. The terminal of claim 1 wherein the cylindrical lens body has end faces which are one of dulled, roughened, and mirrored for reflection toward the interior of the cylindrical lens body.

18. The terminal of claim 1 wherein the end of said radiation conductor has an exit surface and the distance (A) between the exit surface and the bottom of said trough-shaped recess satisfy the following conditions:

$$h \geq A \geq r,$$

wherein h is the depth of said trough-shaped recess and r is the radius of said trough-shaped recess, the diameter of said radiation conductor being approximately the same as the width of said trough-shaped recess.

* * * * *

UNITED STATES PATENT AND TRADEMARK OFFICE
CERTIFICATE OF CORRECTION

PATENT NO. : 4,799,753
DATED : January 24, 1989
INVENTOR(S) : Friedrich-Wilhelm Breitbarth, et al.

It is certified that error appears in the above-identified patent and that said Letters Patent is hereby corrected as shown below:

Column 3, line 49 for "the terminal" read -- The terminal --.

Column 4, line 43 for "$h \geq A \geq r$" read -- $h \leq A \leq r$ --.

Column 6, line 10 for "4" read -- 8 --.

Column 6, line 45 for "$h \geq A \geq r$" read -- $h \leq A \leq r$ --.

Signed and Sealed this

Fourteenth Day of August, 1990

Attest:

HARRY F. MANBECK, JR.

*Attesting Officer*  *Commissioner of Patents and Trademarks*